United States Patent
Inoue

[15] 3,670,137
[45] June 13, 1972

[54] METHOD OF SPARK SINTERING ELECTRICALLY CONDUCTIVE PARTICLES ONTO A METALLIC SUBSTRATE

[72] Inventor: Kiyoshi Inoue, Tokyo, Japan
[73] Assignee: Lockheed Aircraft Corporation, Burbank, Calif.
[22] Filed: Feb. 16, 1970
[21] Appl. No.: 10,090

Related U.S. Application Data

[60] Continuation of Ser. No. 611,497, Nov. 30, 1966, abandoned, which is a division of Ser. No. 356,714, April 2, 1964, Pat. No. 3,340,052, which is a continuation-in-part of Ser. No. 247,387, Dec. 26, 1962, Pat. No. 3,250,892.

[30] Foreign Application Priority Data

Dec. 26, 1961 Japan..................................36/47409

[52] U.S. Cl................................................219/76, 219/149
[51] Int. Cl...........................................................B23k 9/04
[58] Field of Search ..................219/69 F, 69 M, 76, 149–153

[56] References Cited

UNITED STATES PATENTS

| | | | |
|---|---|---|---|
| 2,299,483 | 10/1942 | Lubbe et al.............................. | 219/76 |
| 2,994,762 | 8/1961 | Todd ...................................... | 219/76 |

Primary Examiner—R. F. Staubly
Attorney—Karl F. Ross

[57] ABSTRACT

A method of spark sintering electrically conductive particles, e.g. copper, nickel, ferrochromium and tungsten carbide, onto a metallic substrate (e.g. of nickel, iron or steel) in which a mass of particles is positioned along the substrate in light-contacting relationship therewith. An electric current pulse is applied across the mass of particles to effect a spark discharge among them and between the mass and the substrate to sinter the particles to one another and to the substrate. The method also increases the fatigue resistance of iron and steel when tungsten carbide is spark-sintered thereto.

3 Claims, 25 Drawing Figures

Kiyoshi Inoue
INVENTOR.

BY
Karl F. Ross
Attorney

METHOD OF SPARK SINTERING ELECTRICALLY CONDUCTIVE PARTICLES ONTO A METALLIC SUBSTRATE

This application is a continuation of application Ser. No. 611,497, filed Nov. 30, 1966, which was a division of application Ser. No. 356,714 of April 2, 1964 (now U.S. Pat. No. 3,340,052, issued Sept. 5, 1967), which in turn was a continuation-in-part of application Ser. No. 247,387 of Dec. 26, 1962 (now U. S. Pat. No. 3,250,892, issued May 10, 1966).

The present invention relates to the sintering of discrete bodies or particles to form coherent objects and to the bonding of such bodies to substrates.

Earlier-known sintering techniques, which have found considerable utility in the field of powder metallurgy, in batteries, and in related arts can generally be classified in three categories, depending upon the specific procedure used. The principal known method of sintering involves the heating, usually in electric or gas furnaces but also by induction or dielectric processes, of the mass of particles which is subjected to extremely high pressure, generally on the order of tons/cm$^2$ (1,000 kg/cm$^2$) to effect a welding of the particles together under the elevated pressure. The other conventional methods involve the use of lower pressures, also on the order of tons/cm$^2$, but temperatures sufficiently high to cause considerable flowing of the particulate material, and the use of adhesives or fusion agents which permit the use of lower temperatures but nevertheless require pressures upwards of, say, 500 kg/cm$^2$. It has also been proposed to employ resistance-heating techniques which also require elevated pressure. All of these methods are characterized by the disadvantage that uniform heating is all but impossible and necessitate recourse to expensive hydraulic or pneumatic presses to provide the elevated pressures.

It is the principal object of the present invention to provide an improved method of sintering discrete electrically fusible bodies together without the use of elevated pressures.

It is a corollary object of the invention to provide a method of forming sintered-metal objects having improved properties and compositions not hitherto attainable with known techniques.

Yet another object is to improve the fatigue resistance, frictional characteristics, toughness, tensile strength, wear resistance, corrosion resistance and related properties of metal objects by sintering a surface layer thereto without the use of pressures and heating-techniques which would adversely affect these properties.

Still another object of the instant invention is to provide a method of making improved molds and dies.

Another object of the invention is to provide a method of simultaneously sinter-forming and molecularly orienting bodies composed of discrete particles.

The above and other objects, which will become apparent hereinafter, are attained in accordance with the invention by a method of sintering together a plurality of discrete bodies, comprising the steps of disposing the bodies in relatively light contacting relationship (i.e. under a mechanically applied pressure up to about 100 kg/cm$^2$ but as low as the gravitational force urging some of the particles against others) and effecting a spark discharge between the bodies.

This method is based upon the totally surprising discovery that, contrary to the weight of earlier beliefs that elevated pressures are required to carry out an effective sintering operation, relatively low mechanical pressures can be employed when spark discharge is used. The electric spark, which advantageously possesses a power on the order of hundreds and even thousands of joules, forces the articles into bonding contact with a pressure even greater than that attainable heretofore by mechanical means even when the particles are in relatively light contact. In fact, such light contact is necessary to the development of the necessary spark which also provides sufficient heat to cause the particles to bond together with great strength. It should be noted that earlier resistance-heating techniques contrast sharply with the present method in that the earlier process required that the pressure applied to the mass of particles be sufficient to reduce the contact resistance to a level substantially equal to the internal resistance of the particles so that a high current could be passed through the mass to develop the necessary bonding heat. In contradistinction thereto, the present method requires that the contact resistance be greater than the internal resistance and, preferably, several times as great so that, at least during initial stages of the sintering operation, most of the applied energy is in the form of the spark discharge with relatively little being dissipated in resistive heating of the particles. Since the sintering action occurs immediately upon the space discharge, the completed body can be formed in a matter of seconds as compared with earlier methods requiring tens of minutes and even hours to effect complete sintering.

According to a more specific feature of the invention, a mass of discrete electrically fusible particles, preferably consisting predominantly of conductive metallic bodies, is disposed between a pair of electrodes which sustains the spark discharge. Since this mass naturally tends to shrink as sintering proceeds, means should be provided to maintain the electrodes in contact with the mass. To this end, the electrode means may be spring or gravity loaded or some positive drive means may be provided for maintaining the contact and, if desired, providing a mechanical pressure up to, say, 100 kg/cm$^2$ when required. The spark discharge may be terminated upon the particles being welded together, at least preliminarily, while passage of the electric current may be continued without development of the spark to weld the particles further by resistance heating.

The mass of conductive particles may be admixed with up to 20 percent by weight of nonconductive particles (e.g. of a synthetic resin) which constitute a filler adapted to improve the properties of the sintered body. The filler may be designed to reduce the weight, decrease the coefficient of friction, provide voids by volatilization upon firing or the like. When a synthetic resin filler is employed, it is desirable to choose a material which can withstand elevated temperatures and yet is thermally fusible to a certain degree so that a bond is formed between the conductive and nonconductive particles. Suitable admixtures thus may be polyamides, polyesters and phenolic resins.

It is possible, according to the invention, to bond the conductive particles to continuous metal bodies. The latter may then be formed as electrodes or disposed in the particle mass in contact with the electrodes so that a firm fusion bond is produced at the interface; the continuous body, which need not be of metal, may also be imbedded in the mass of particles and physically locked within the coherent structure. Since the coherent structure may be more or less porous as required, this method has particular application in the electrochemical field wherein the unit can act as an electrode with the continuous member serving as the terminal. Advantageously, the continuous member should have an atomic or molecular size (volume or "diameter") which is less than the atomic size of the material constituting the particles so that a firm adhesion is insured. Thus, the continuous member may serve as a support for a contoured sintered body in the form of a die for electrochemical or electric-discharge machining, stamping, pressing or hot forming of objects. Moreover, the sintered particles can, according to another feature of the invention, serve to increase fatigue resistance, tensile strength and other desirable characteristics of a metallic body or to constitute a corrosion-resistant layer therefor. The particles may, consequently, be composed of a stainless steel (e.g. ferrochrome) or another material capable of resisting electrolytic action.

It is desirable to superimpose a periodic current upon a direct current applied across the spark-discharge electrodes to avoid a preheating effect. The periodic current (e.g. an alternating current of less intensity than the direct current) may be terminated upon cessation of the spark discharge so that only a unidirectional field is applied to the sintered body. The periodic current can derive from a capacitor bridged across the electrodes or from some other alternating-current source.

Advantageously, the capacitor works into a resistance, which may be the ohmic impedance of the spark gap or the conductors connecting the source with the electrodes, to provide a time constant which varies as sintering proceeds and eventually results in complete elimination of the periodic current. It has been discovered that such apparatus renders it possible to provide complete control of the density of the sintered articles since increased power and elevated electrical frequencies result in a greater compaction of the mass under the same mechanical pressures. It is contemplated, therefore, to provide means responsive to the density of the body (e.g. by determining the voltage drop thereacross) for controlling the power source by varying the intensity or frequency of the spark discharge. It has also been discovered that it is possible to control the density of the sintered body by controlled vibration of the particle mass before and during the spark discharge and regulating, within narrow limits as defined by the upper pressure range, the mechanical pressure applied to the particles.

Yet another feature of the invention resides in the concentration of the electric current at certain regions of the particle mass so as selectively to increase the density of the sintered body in these regions. This concentration of current can be effected by disposing a conductive member within the mass, the conductive member having an internal resistance substantially less than the contact resistance of the particles. The current will thus preferentially pass through this member, which displaces particles having a resistance greater than its internal resistance, so that the member is both bonded firmly into the body and serves as the nucleus for a relatively dense core therein. This core, which is formed in situ, serves as a support for more porous outer regions and is particularly suited for use in electrochemical systems wherein the porosity of the body enables extremely high discharge rates. Alternatively, it is possible to concentrate the current density at certain regions of the sinterable mass by forming the electrodes so that there is a predetermined shortest current path through the region to be densified. It is also possible to effect densification by varying the intensity of the spark as it traverses the particle mass. Thus, if it is desired to produce an elongated porous body having relatively dense supporting extremities, the initial spark intensity may be three to four times that employed as the spark traverses the central portion of the mass. The spark intensity is again increased as the spark approaches the other extremity. In general, the spark will proceed from one electrode to the other as a consequence of the unidirectional basic electrical field applied across the electrodes although under certain circumstances a spark may proceed from each electrode toward the center. It is also contemplated to carry out the entire sintering operation with a single spark discharge in which case a space discharge between the electrodes is employed. To distribute the space discharge to peripheral portions of the mass, a nonconductive member may be disposed within the latter approximately midway between the electrodes. A dense region can also be obtained by disposing therein relatively small-sized particles while relatively large-sized particles are present elsewhere in the body.

The sintering operation can be carried out under any ambient atmosphere (e.g. oxidizing, inert or reducing, as desired) and even under liquid. In the latter case it is preferred that the liquid be a dielectric so as not to sustain the passage of spark-dissipating electrical currents by electrolytic action. This method of sintering also permits the molecular orientation of the sintered body so that the latter can, in effect, constitute a single crystal in many instances. It should be noted that molecular orientation can only be achieved with the aid of a relatively strong unidirectional electromagnetic force field. This force field is, in effect, present in the spark discharge and is maintained by the passage of unidirectional electric currents between the electrodes and through the mass. It has also been discovered that vibration of the mass and/or the electrodes during the spark discharge permits control of the crystal size and orientation.

The present method is also adaptable to continuous formation of sintered bodies. A mass of sinterable particles can be continuously passed through a spark gap formed between a pair of electrodes, one of which may be constituted by the coherent, previously sintered material. It is also possible to provide means for repeatedly removing sintered bodies from between the electrodes for the production of tablets, pellets or the like. During continuous operation the die, mold and electrodes may be cooled by air or water to dissipate the heat developed. In many cases the sinterable particles may be contained in a mold under their own weight while the spark discharge is carried out between electrodes extending into or forming part of the mold. It should be understood, however, that the slight mechanical pressure required may derive from one or more electrodes which may be spring biased or urged against the particles by gravitational force.

The above and other objects, features and advantages of the present invention will become more readily apparent from the following description, reference being made to the following drawing in which.

Figures 1, 2, 3, 4, 5:
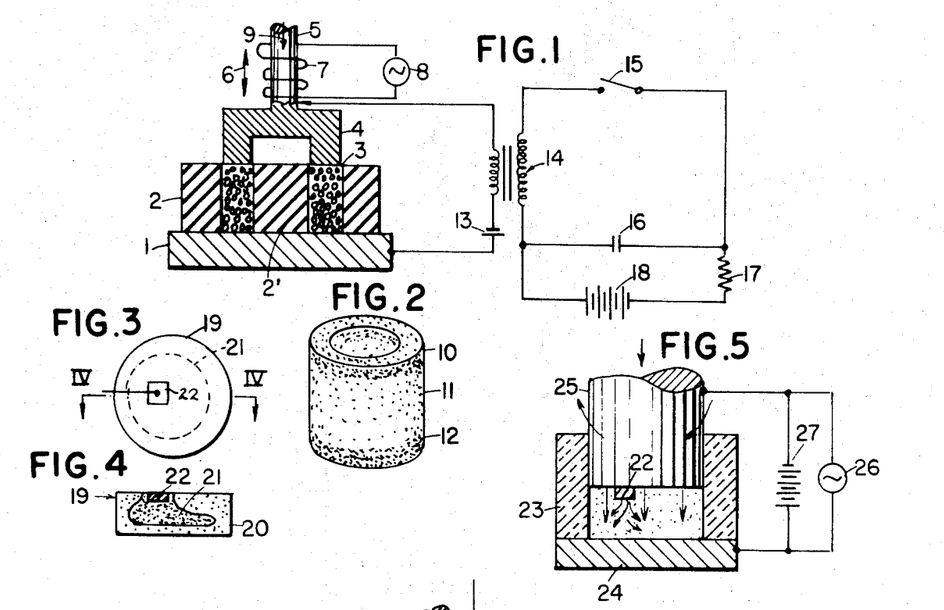
FIG. 1 is an axial cross-sectional view through a mold for forming a tubular sintered body with the circuit means therefor.
FIG. 2 is a perspective view of the body produced by this apparatus.
FIG. 3 is a plan view of a sintered electrode for batteries.
FIG. 4 is a cross-sectional view taken on line IV — IV of FIG. 3.
FIG. 5 is an axial sectional view through an apparatus for making the electrode.

In FIG. 1 there is shown an apparatus for producing tubular porous bodies which can serve as filters or the like. The apparatus comprises a conductive base plate 1 upon which is disposed a tubular mold 2 having a core 2'. The mold cavity 3 of this mold contains a mass of sinterable particles which is compacted under the weight of an electrode 4. The shank 5 of this electrode is surrounded by a coil 7 which is energized by an alternating-current source 8 for vibration of the electrode 4 in the direction of the arrow 6. Electrode 4 is urged downwardly (in the direction of arrow 9) by gravitational force. A battery 13 is bridged, in series with the secondary of a transformer 14, across the electrodes 1 and 4 while another direct-current source 18 is connected in series with a load resistance 17 represented as a separate resistor but actually the resistance of the conductors tied to transformer 14. A capacitor 16 is connected across the battery 18 and resistor 17.

A mass of conductive powder or an admixture of conductive powder with up to 20 percent by weight of a nonconductive powder is disposed in the mold cavity 3 and vibrations initiated in the direction of arrow 6. With a frequency determined by the time constant of resistor 17 and capacitor 16, the latter periodically charges from battery 18 and discharges across the primary winding of transformer 14 when the switch 15 is closed. A pulsed current, superimposed upon direct current of battery 13, is thus applied to the electrodes 1 and 4. A spark discharge is initiated between the electrode 1 and 4 and the particle mass in contact therewith. Since the particles are in relatively light contacting relationship, this spark proceeds through the mass to form a coherent sintered body therefrom.

EXAMPLE I

The mass of particles disposed in a graphite mold cavity 3 comprises a first layer 12 of relatively small-sized particles (e.g. having a particle size of approximately 0.025 mm). This layer is followed by a relatively larger layer of large-size particles 11 having a particle size of about 0.1 mm and is followed by another layer 10 of the small-size particles. The mass of particles consists, substantially uniformly, of 70 percent by weight copper and 30 percent by weight zinc. The resulting body, which is formed by a 400 cycle per second spark discharge having an overall intensity of approximately 250 kilojoules over a processing time of 25 seconds, has a tensile strength of 7 kg per mm$^2$ as compared with 5.3 kg per mm$^2$ for a similarly dimensioned porous body produced by thermal fusion in a furnace and under elevated pressures. The total mechanical pressure applied to the mass of particles is approximately 50 kg per cm$^2$. Microscopic examination of the body fracture indicates that the pore distribution is substantially uniform (at a magnification of 50 X) in contradistinction to the irregular pore formation of earlier bodies. In addition, the porosity is approximately 67 percent as compared with 60 percent for bodies formed by a known techniques. A total spark discharge of approximately 250 kilojoules was employed. The body was characterized by terminal zones 10 and 12 of relatively densely packed material which served to reinforce these regions of the body which had a total weight of approximately 450 g.

EXAMPLE II

The metal particles of Example I were replaced by a mass of particles consisting substantially of 80 percent by volume copper, 5 percent by volume of a synthetic resin (Bakelite phenolic), 5 percent carbon (graphite) and 10 percent lead. All of these materials were present as powders passing 325 mesh. The tube which had a diameter of 20 mm, an internal diameter of 10 mm and a length of 15 mm, was formed by the passage of a spark discharge (repetition frequency approximately 400 cycle/sec) having a total energy of 10 kilojoules for a period of 3 seconds. The mechanical pressure applied was approximately 500 g per cm$^2$. The resulting bearing sleeve had a friction coefficient (0.02) which was substantially improved over a conventional sintered copper lead bearing (friction coefficient 0.065; wear ratio 2.7 mm/km) having similar proportions of copper and lead; the improved bearing had a wear ratio of 0.87 mm/km at 8 meters/sec. speed against carbon steel with motor oil lubricant and a contact pressure of 12 kg/cm$^2$.

In FIGS. 3 and 4 there is shown a sintered nickel electrode for use in nickel/cadmium batteries and capable of high-rate discharges. The electrode 19 has a peripheral zone 20 of relatively porous material and an internal core 21 of relatively dense material which is bonded to a contact plate 22. Zone 21 is formed in situ by the concentration of electric current as can be seen in FIG. 5. In the latter figure, a nonconductive mold 23 is disposed upon a conductive electrode plate 24 which is juxtaposed with a rotatable electrode 25. A direct-current source 27 is bridged across these electrodes in parallel with an alternating-current source 26.

EXAMPLE III

A mass of nickel powder having a particle size of approximately 2 microns is disposed in the mold 23 and a nickel plate set eccentrically in the mass. This nickel plate has a thickness of 0.2 mm and is of 3 mm width and 5 mm length and rests against the electrode 25 (15 mm diameter, 5 mm thickness) which is rotated to prevent adhesion of the particles thereto. A mechanical pressure of 150 g/cm$^2$ is applied to the mass and a spark discharge (repetition frequency 400 cycles/sec) of approximately 180 kilojoules is passed therethrough for about 6 seconds. The alternating-current power (400 cycles/sec) is approximately 60 percent of the direct-current power with a frequency of about 10 kc/sec. The resulting body had a diameter of 15 mm and a thickness of about 5 mm with a central region 21 having a thickness of approximately 1 mm while the peripheral zones 20 had thicknesses of about 2 mm. The porous outer shell was characterized by a specific gravity of approximately 2 while the dense inner core had a specific gravity of approximately 7. Examination of the sintered body structure indicated a relatively sharp separation between the core and the shell. The resulting electrode was capable of discharging rates up to 10 times that attainable by known practices in a nickel-cadmium cell charged at 30 ma for 12 hours and discharged at 50 ma over a period of 6 hours.

Figure 6:
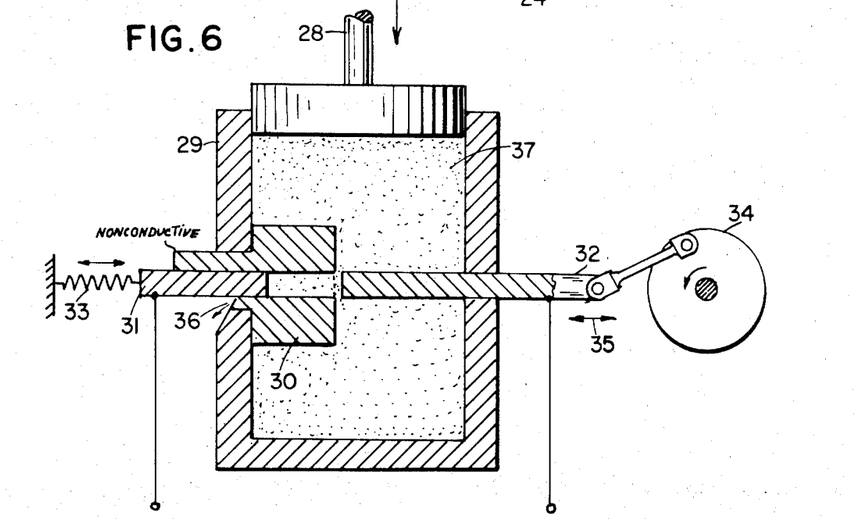
FIG. 6 is a diagrammatic cross-sectional view through an apparatus for the mass production of sintered bodies.

The apparatus in FIG. 6 serves for the serial production of sintered bodies and comprises a piston 28 which urges a mass 37 of sinterable powder within a casing 29 into the cavity formed within a mold 30. The mechanical pressure is, however, less than 100 kg/cm$^2$. A pair of electrodes 31, 32 are slidable into the mold cavity, electrode 32 being provided with a drive source 34 for reciprocating it in the direction of arrow 35. Electrode 31 is spring biased by a coil spring 33 and yields as member 32 is positively reciprocated so that a pressure of up to 100 kg/cm$^2$ is maintained upon the mass within the mold cavity. The electrodes are connected across a source of direct current and of periodic current superimposed thereon. With each reciprocation of electrode 32, a spark discharge is sustained between the electrodes which results in sintering of a body within the cavity of mold 30. As electrode 32 moves into its extreme left-hand position, it pushes the sintered body thus formed out of the cavity from which it falls in the direction of arrow 36. When electrode 32 is again withdrawn from the cavity, piston 28 pushes additional powder into the latter for repetition of the operation.

Figure 7:
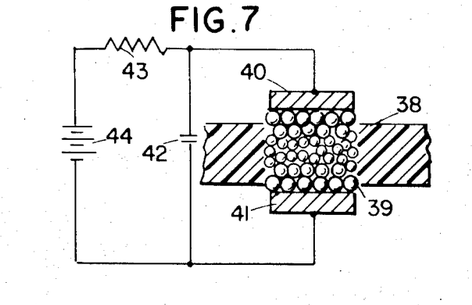
FIG. 7 is a diagrammatic cross-sectional view illustrating the production of a conductive seal.

In FIG. 7 I show the in-situ formation of a sintered body in forming a liquid-light seal. A battery casing 38 is provided with a bore which constitutes a mold for a mass of sinterable particles 39 which is disposed between electrodes 40 and 41. The latter are bridged by a direct-current source 44 in series with a resistor 43 and by a capacitor 42. The spark discharge developed across the electrodes 40, 41 results in a sintering together of the particles 39 and a thermobonding of the sintered body with the battery casing 38 which may be of thermoplastic or synthetic-resin material. Particles, having a maximum size of approximately 10 microns, can be used in this connection to produce a liquid-impermeable seal which nevertheless permits the escape of gases and is conductive.

Figure 8:
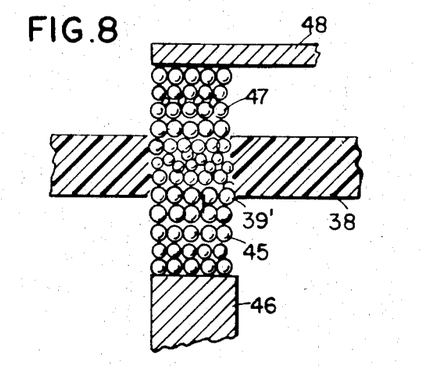
FIG. 8 is a view of this seal as employed in a battery.

As can be seen in FIG. 8, the sintered body 39' thus resulting may be spark welded to a mass 45 of sintered particles carried by a battery electrode 46 and to a mass 47 of similarly sintered particles provided on the terminal tab 48. This arrangement, wherein all of the particles may, advantageously, provide means for completely sealing the terminal to the case to prevent the escape of liquids.

Figure 9:
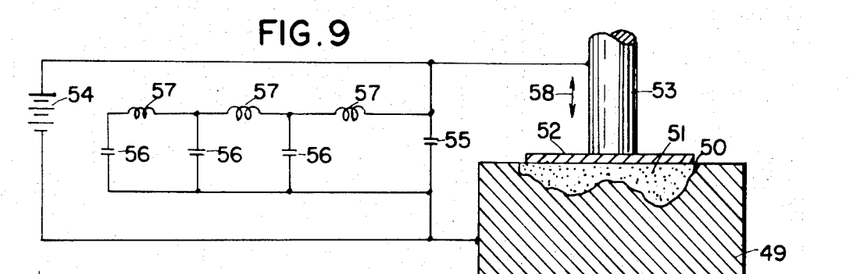
FIG. 9 is an axial cross-sectional view of a device for producing a sintered die.

In FIG. 9 there is shown an arrangement for producing dies. A conductive block 49 is formed with a contoured mold cavity 50 which contains a mass of particles 51. A counterelectrode 52 overlies this mass of particles and is provided with a support rod 53 via which it is spring biased into contact with the particles. A battery 54 is bridged across the electrodes 52 and 49 together with a capacitor 55 while a delay line, consisting of inductances 57 and capacitances 56, is also connected across capacitor 55. This delay line provides a series of secondary pulses which follow the initial spark discharge as produced by capacitor 55.

EXAMPLE IV

A mass of ferrochrome (18–8) stainless-steel particles having an approximate particle size of about 14 microns is disposed in the cavity 50 of block 49 which consists of carbon. The vertically vibrating electrode 52, which is composed of high-carbon steel, provides a mechanical pressure downwardly of 0.56 kg/cm$^2$ (maximum pressure 270 kg/cm$^2$). The direct-current voltage of source 54 is about 50 volts while the delay line 56, 57 together with capacitor 55 superimposes an alternating-current voltage thereon of approximately 400 cycles per second with an intensity of 120 volts. The spark repetition was 400 cycles/second and the total discharge intensity 27 kilojoules. The sintered body is bound firmly to the electrode 52 and has a specific gravity equal to 99 percent of the specific gravity of solid ferrochrome when the electrode is vibrated in the direction of arrow 58. This vibration takes place at 100 cycles per second. Without such vibration this specific gravity is only 98 percent of that of the solid material. To produce a die having a length of 20 mm, a width of 10 mm and a thickness of 10 mm approximately, 10 seconds are required. The duration of the spark discharge is, however, only a fraction of the total processing period (e.g. less than one second). A die sintered in a conventional furnace has a specific gravity of 88 percent of the solid material.

Figure 10:
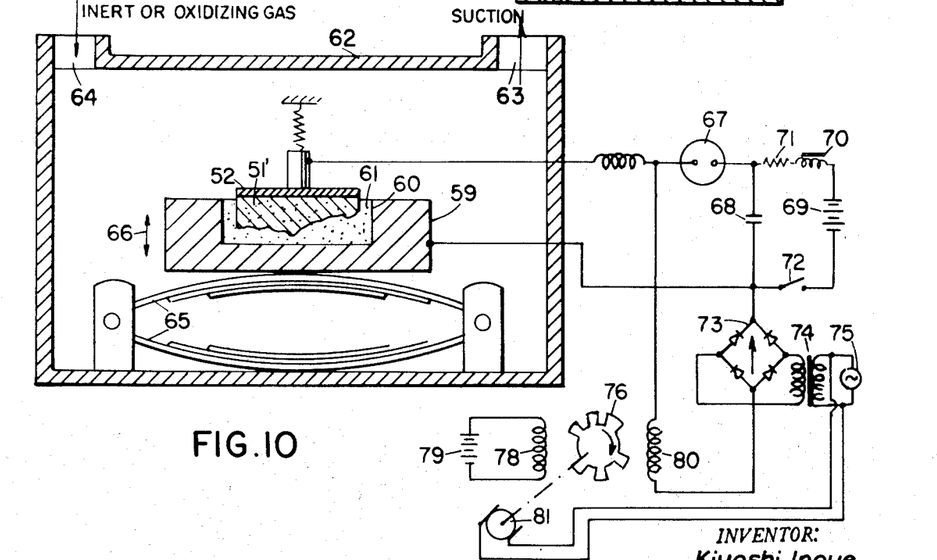
FIG. 10 is a cross-sectional view diagrammatically illustrating the manufacture of a forming die or mold using the sintering technique of the invention.

In FIG. 10 I show another arrangement, this time for the production of a female die, wherein the carbon-steel block 59 is provided with a cavity 60 containing the particles 61. An electrode 51' of sintered metal is carried by a plate 52 and serves to form the contoured sintered female die. The entire unit is enclosed in a casing 62 from which air may be aspirated at 63 and into which a suitable atmosphere may be introduced via an inlet 64.

The block 59 is carried by a pair of leaf springs 65 and is vibrated in the direction of arrow 66 by suitable means not shown. In the present embodiment the delay line disclosed in connection with FIG. 9 is dispensed with and the circuit means includes a spark gap 67 of predetermined dimension which is tied in series with the capacitor 68 across the electrodes 52 and 59. A battery 69 in series with a choke 70 and the lead resistance 71 is bridged across the capacitor 68 with a switch 72. The characteristics of this circuit are so selected that the pulsed direct-current discharge of capacitor 68 and battery 69 is insufficient to bridge the spark gap 67 during initial sintering when a sintering gap is present between the electrodes but is, however, capable of continuously discharging across gap 67 when an initial sintering of the powder has been effected. To produce a breakdown or discharge across gap 67 during the earlier stages or operation there is provided an additional circuit consisting of a rectifier bridge 73 which is tied to the secondary of an isolating transformer 74 supplied by an alternating-current source 75. This direct current does not flow across the gap 67 and the capacitor 68 until supplemented by a triggering pulse derived from a rotatable inductor 76 of magnetically permeable material. An energizing coil 78 is supplied by a direct-current source 78 to develop a constant magnetic field which, when traversed by the projections of wheel 76, is concentrated and swept across a pick-up coil 80, in series with rectifier bridge 73. Rotation of wheel 76 by motor 81 results in the periodic sweeping of coil 80 by the tabs with a consequent induction of a primary breakdown pulse and a plurality of lesser pulses. The pulsed current (e.g. at a frequency of about 400 cycles per second) for ferrochrome powder as employed under the conditions indicated in Example IV continues only until the spark discharge through the particles 61 terminates. Thereafter, with gap 76 in a substantially constant state of discharge, a direct current is applied to the electrode by battery 69 as supplemented by bridge 73.

Figure 11:
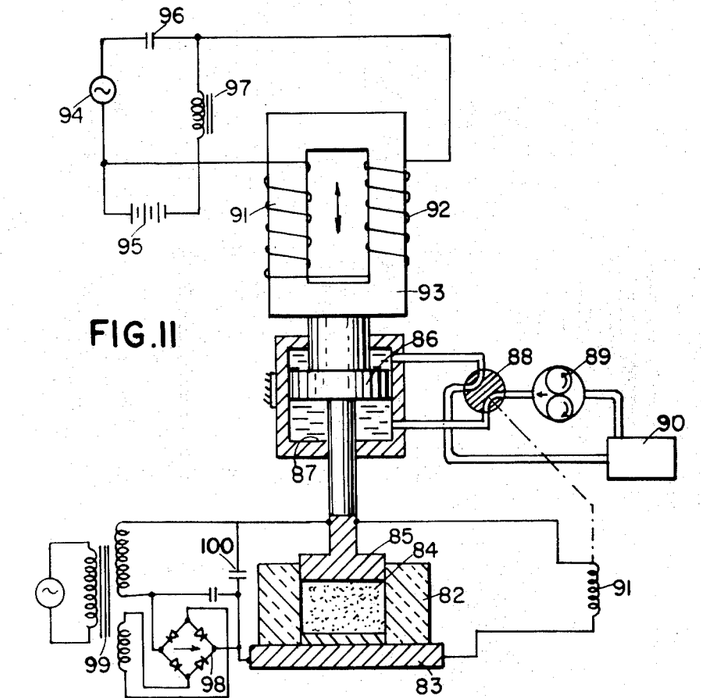
FIG. 11 is a partial cross-sectional view of still another apparatus according to the invention.

The apparatus shown in FIG. 11 can be used for the production of sintered bodies under continuously controlled conditions. The nonconductive mold 82 is disposed upon an electrode plate 83 and contains the powder 84 which is lightly compressed by a counterelectrode 85. The mechanical pressure of the latter is determined by the position of its piston 86 which is received within a hydraulic cylinder 87. Hydraulic fluid is supplied to the latter by a distributing valve 88 which is fed by a pump 89 from a reservoir 90. The distributing valve 88 is controlled by a solenoid coil 91 bridged across the electrodes 83 and 85 and responsive to the potential drop thereacross. It will be immediately apparent that this potential drop is a direct measure of the density of the particles since greater compaction involves a decreased resistance thereacross. Additionally, there is provided a magnetostrictive vibrator for oscillating the electrode 85 within limits. This vibrator comprises a pair of windings 91, 92 connected in aiding relationship and wound about the shanks of a D-shaped coil 93. These coils are energized by an alternating-current source 94 whose output is superimposed upon a direct-current voltage derived from a battery 95. A capacitor 96 is tied in series with source 94 across the coils 91, 92 while a choke 97 is serially connected with battery 95. The direct-current biasing potential applied to the electrodes 83, 85 derives from a rectifier bridge 98 which is fed by a secondary winding of transformer 99 whose other secondary applies a superimposed alternating current. Again the electrodes are bridged by a capacitor 100.

Figure 12:
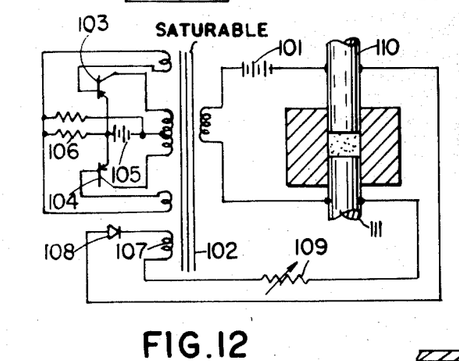
FIG. 12 illustrates a circuit diagram according to a modification.

Whereas the arrangement shown in FIG. 12 permits control of the density of the sintered body by varying the mechanical pressure applied thereto, it is preferable in many instances to control the density by the characteristics of the spark discharge. This may be effected by regulating the frequency of the discharge at least during the early stages. To this end the direct-current source 101 is connected in series with the output winding of a transformer 102. This transformer forms part of a varying-frequency oscillator and is saturable to control this oscillator. The oscillator consists of a pair of push-pull transistors 103, 104 whose emitters are energized by a battery 105 in series with respective sections of the primary winding of the transformer. The base of each transistor is serially connected with the energizing windings of the transformer and returned to the emitter via a suitable biasing resistor 106. The transformer is also provided with a control winding 107 in series with a rectifier 108 and a variable resistor 109 for determining the degree of saturation of the core and thus the frequency of oscillation. The control circuit is bridged across the electrodes 110, 111 and detects the direct-current-voltage drop thereacross. This circuit is poled so as to increase the frequency of the oscillation should the density of the sintered body below a predetermined value.

Figure 13:
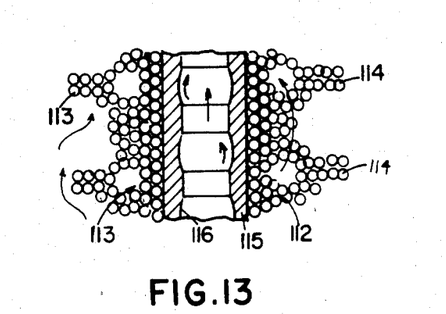
FIG. 13 is an axial cross-sectional view through a heat-exchanger tube in accordance with the invention.
Figure 14:
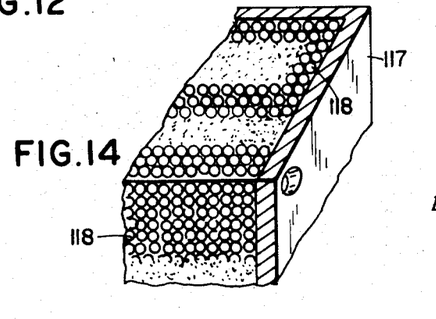
FIG. 14 is a perspective cross-sectional view through a radiator produced by the present method.

In FIGS. 13 and 14 there are illustrated heat-exchange arrangements produced by the method and apparatus of the present invention. The structure of FIG. 13 makes use of a sintered sheath 112 to provide a fluid-permeable layer of high-surface area around and through which a gas or liquid can pass as indicated by the arrows 113. This layer can be formed with the usual fins 114 and is bonded to the metallic tube 115 which is internally contoured (i.e. provided with annular depression 116) to increase turbulence in the fluid flowing therethrough. Radiator 117 of FIG. 14 is provided with channels 118 formed by relatively coarse particles (particle size between 60 and 100 microns) between dense rows formed by fine particles (1 to 6 microns). The entire body, which can be formed in a single sintering operation by the methods previously described, can be composed of copper particles and has excellent heat-exchange characteristics.

Figures 15, 16, 17, 18, 19, 20, 21, 22, 23, 24, 25:
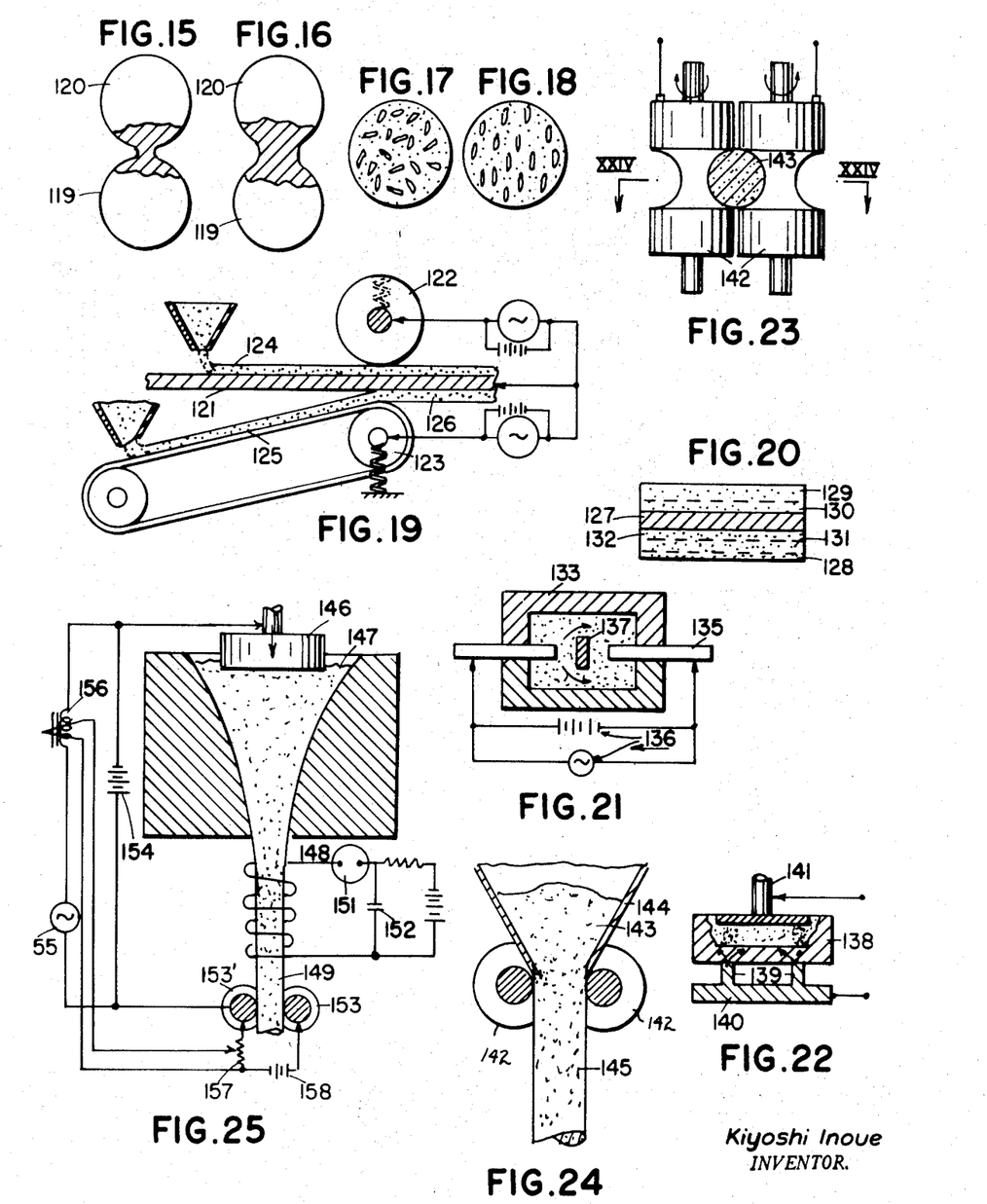
FIGS. 15 and 16 are partial cross-sectional views diagrammatically illustrating two stages of the instant method.
FIG. 17 is a representation of a sintered body prior to molecular orientation.
FIG. 18 is a similar view of this body subsequent to such orientation in accordance with the invention.
FIG. 19 is an elevational view, partly in section, of an apparatus for continuously depositing a sintered layer upon a substrate.
FIG. 20 is a cross-sectional view through a sintered body having a continuous metal core and multiple layers.
FIG. 21 is an axial cross-sectional view through a mold for producing sintered bodies by spark discharges.
FIG. 22 is a view similar to FIG. 9 illustrating selective densification of the sintered body.
FIG. 23 is a partial bottom view of an apparatus for continuously producing sintered rods according to the invention.
FIG. 24 is a cross-sectional view taken along the line XXIV — XXIV of FIG. 23.
FIG. 25 is a view similar to FIG. 24 illustrating a modification of the continuous process.

FIGS. 15 and 16 are schematic illustrations as to what occurs in the course of the present method. During the initial stages of sintering, the bodies 119 and 120, which are generally of irregular configuration in practice, are in light contact or even slightly spaced so that a spark discharge is formed between them. This discharge forces them into contact under considerable pressure and effects a flow of material between them at their contact region. Subsequent passage of current (FIG. 16) causes the particles to flow together to a greater extend and, since it is effected under the force field of a unidirectional electric current, results in an internal crystal orientation so that the fusion point is indistinguishable from the remainder of each particle. They thus constitute a single crystal. This effect characterized substantially all of the methods presently described.

The molecular orientation of sintered bodies is more dramatically represented in FIGS. 17 and 18 wherein magnifications of oriented and nonoriented bodies of sintered dentritic material are shown.

EXAMPLE V

A mass of dendritic alnico alloy particles, having a mean particle size of 0.1 mm, are formed into a rod having a diameter of about 2 mm and a length of 5 mm, is formed in an apparatus of the type shown in FIG. 12 (graphite holder). A spark-discharge sintering operation (total time 10 sec) was performed and a total energy of 10,000 joules at an ambient pressure of $10^{-2}$ mm. A pressure of 250 kg/cm$^2$ was applied during sintering. The sintered body was removed immediately after the first discharges (about 2,500 joules – 5 seconds) and found to have a random distribution of 10 micron dentrites when etched with $HNO_3$ + alcohol (FIG. 17). When the operation was carried out again with about 5,000 – 7,500 joules required (10 seconds used), the dendrites were found to be aligned in uniform rows about 0.5 mm in length and 0.3 mm in width (FIG. 18). The corrodability of the molecularly oriented body was found to be less than that of the similarly sintered but not oriented body when exposed to etching liquid. In addition, similar test conditions indicated that the resistance-sintered conventional magnete had a strength of 1,500 to 2,000 gauss while spark-sintered bodies had a minimum strength of 2,000 gauss prior to molecular orientation and from 3,500 to 4,000 gauss subsequent thereto.

EXAMPLE VI

Similar techniques were employed with a magnetic mixture consisting by weight of 85 percent iron, 10 percent zinc and 5 percent $Cu_2O$. The mixture was formed in suspension in a volatile vehicle (ethyl alcohol) and a discharge current passed therethrough at a pressure of 130 kg/cm$^2$ applied to the particles in the holder. About 5,000 joules were employed during the discharge sintering and the remainder for orientation. A total time of 3 seconds was required for a rod having a length of 5 mm and a diameter of 10 mm in a graphite holder. All of the particles ranged in size between 5 and 10 microns. The ferrite rod was found to have greater magnetic retention (1.7 oersted) than rods having similar Fe contents but formed by conventional techniques from iron oxide (1.5 oersted).

The apparatus of FIG. 19 permits continuous formation of sintered layers upon a metal substrate. The substrate 121 may be a metal sheet to be clad with the sintered metal layer to improve its fatigue and corrosion resistance, is passed between a pair of rollers 122, 123 serving as counterelectrodes for the sheet. As the upper layer of, say, ferrochrome powder 124 is deposited upon the sheet and bonded thereto while being sintered into a coherent coating upon passage into the spark zone at electrode 112, the lower layer 126 is carried by the conductive band 125 into the spark zone and bonded thereat to the substrate.

EXAMPLE VII

A dumbbell-shaped rod having enlarged extremities (50 mm diameter) and a shank of smaller diameter (30 mm), the total rod length being about 150 mm with the shank having a length of 50 mm, is provided with a surface coating of 0.02 mm of tungsten carbide by spark discharge. The rod was poled negative with the counterelectrode positive while a total power of 2,000 joules was employed for a sintering time of 4 seconds at a pressure of 3 kg/cm$^2$. The particle size was 0.5 microns. Repeated bending under a stress of 50 kg/mm$_2$ on an ono-type rotary fatigue-testing machine demonstrated that an uncoated high-carbon steel rod broke after $5 \times 10^3$ cycles while the treated rod broke only after $5 \times 10^5$ cycles.

The substrate 127 of FIG. 20 is shown to be provided with a plurality of superimposed layers of sintered metal. It is thus possible, merely by positioning a series of layers of different metal particles in one of the molds previously described to bond, say, an aluminum layer 128, 129 to a layer of copper 130, 131. This in turn may be fused directly to the metal or to a nickel layer 132 thereon. Since the atomic size of aluminum is less than that of the steel substrate, there will be little tendency for the aluminum to adhere directly to it.

In the arrangement of FIG. 21, a casing 133 forms a separable mold into which extend the juxtaposed spaced electrodes 134 and 135. The circuit means 136 develops a space discharge, which is spread by the dielectric distributor 137 to the periphery of the body, between the electrodes to sinter the particles together and imbed the electrodes therein.

Another device for localizing the passage of current in the sintering of powders is illustrated in FIG. 22. The conductive but highly resistant block 138, which may be composed of carbon, is engaged by spaced contacts 139 of an electrode 140. The spark discharge developed between a counterelectrode 141 and the block 138 is localized in the region of contacts 139 since these regions constitute low-resistance paths, thereby producing a sintered body having increased density at these regions.

The apparatus of FIGS. 23 and 24 is designed to permit the continuous sintering of particles into a coherent rod. The apparatus comprises a pair of shaping rollers 142 which are spaced from each other and pass a spark discharge through powdered metal 143, supplied by the hopper 144, therethrough. The emanating rod is coherent and may constitute an electrode as indicated in FIG. 25. In this case the feed plunger 146 applies a light mechanical pressure to the powder within the hopper 147 whose constriction 148 forms a die. Since the previously formed rod 149 is coherent and conductive, it may constitute an electrode so that a spark discharge results at the die. A magnetic shaping of the coherent rod, which nevertheless is somewhat plastic as a result of its elevated temperature, is carried out by applying a pulsed current through a surrounding winding. This pulsed current is developed across a spark gap 151 by a capacitor 152 as previously described.

A pair of rollers 153, 153' serve as contacts for the rod 149. Roller 153' is connected to one output terminal of a circuit whose battery 154 bridges the electrodes in parallel with an alternating current source 155. The latter is, in turn, tied to a saturable reactor 156 which controls the AC power level and has its biasing winding in series with the wiper of a potentiometer 157. The latter is in circuit with a biasing battery 158 across the rollers 153, 153'. Should the density of the rod 149 suddenly fall, the voltage drop detected across rollers 153, 153' will increase to cause the saturable reactor to raise the power level and vice versa.

I claim:

1. A method of increasing the fatigue resistance of an iron-containing metallic body, comprising the step of spark sintering a surface layer of tungsten carbide thereto by positioning a mass of tungsten-carbide powder along said body, positioning an electrode in continuous direct contact with said powder but with a spacing from said body and intermittently effecting an interrupted impulsive spark discharge between said electrode and said body and among the particles of said powder and between the body and the particles of said mass proximal to said body, said discharge being dimensioned to fuse said particles to one another and said body without melting of said mass.

2. A method of sintering metallic particles onto a metallic substrate of a material having an atomic size less than substantially the atomic size of the material constituting said particles, comprising the steps of juxtaposing said substrate with an electrode spaced therefrom, disposing a mass of said particles in contact with said substrate in the region of the gap between said electrode and said substrate and in continuous direct contact with said electrode, intermittently passing an impulsive electric current between said substrate and said electrode, and establishing the magnitude of said current and the compaction of said mass against said substrate to effect interrupted spark discharge among said particles and between said substrate and the particles of said mass proximal thereto, thereby bonding said particles to said substrate without melting of said mass.

3. A method of forming a body consisting of a continuous metallic layer and a sintered layer bonded to said metallic layer, comprising the steps of: disposing a mass of conductive spark-sinterable particles between a pair of electrodes in relatively light contacting relationship and in continuous direct contact with both said electrodes, at least one of said electrodes being metallic and spark sinterable to said mass while forming a substrate lightly juxtaposed with the mass of particles; and triggering impulsive and intermittent electric-current flow between said electrodes of a magnitude sufficient to effect a spark discharge between said one of said electrodes and among at least some of said particles but less than that at which an arc is formed between said electrodes to fuse said particles together and concurrently to fuse said particles to said one of said electrodes without melting of said mass.

* * * * *